*US010079900B2*

(12) United States Patent
Bouchard et al.

(10) Patent No.: US 10,079,900 B2
(45) Date of Patent: Sep. 18, 2018

(54) TECHNIQUES TO MANAGE PRESENCE INFORMATION

(75) Inventors: Thomas Bouchard, Seattle, WA (US); Eran Shtiegman, Redmond, WA (US); Sriram Parameswar, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1693 days.

(21) Appl. No.: 12/127,010

(22) Filed: May 27, 2008

(65) Prior Publication Data

US 2009/0300095 A1    Dec. 3, 2009

(51) Int. Cl.
| | |
|---|---|
| *G06F 15/16* | (2006.01) |
| *H04L 29/08* | (2006.01) |
| *H04L 29/06* | (2006.01) |
| *G06F 12/00* | (2006.01) |

(52) U.S. Cl.
CPC .......... *H04L 67/24* (2013.01); *H04L 65/4092* (2013.01)

(58) Field of Classification Search
CPC ....... H04L 12/581; H04L 67/24; H04L 45/00; H04L 45/14; H04L 12/58; H04L 65/4092; H04L 69/24; H04M 1/72519; H04M 2242/15; B60R 1/12; H04N 21/4622; G06F 11/324; G06F 11/3476; H04W 56/00; G06Q 20/0855
USPC ............................................. 709/204; 705/8
See application file for complete search history.

(56) References Cited

U.S. PATENT DOCUMENTS

| | | | | |
|---|---|---|---|---|
| 4,625,081 A | * | 11/1986 | Lotito et al. | 379/88.26 |
| 4,686,698 A | * | 8/1987 | Tompkins et al. | 348/230.1 |
| 4,809,267 A | * | 2/1989 | Higuchi et al. | 370/460 |
| 5,845,257 A | * | 12/1998 | Fu et al. | 705/7.18 |
| 6,580,787 B1 | | 6/2003 | Akhteruzzaman et al. | |
| 6,731,609 B1 | * | 5/2004 | Hirni et al. | 370/260 |
| 7,065,525 B1 | * | 6/2006 | Sasaki et al. | 369/13.01 |
| 7,215,968 B2 | | 5/2007 | Fujiwara | |
| 7,248,677 B2 | | 7/2007 | Randall et al. | |
| 7,298,833 B2 | | 11/2007 | Klein et al. | |

(Continued)

OTHER PUBLICATIONS

Wei Li, "Towards a Person-Centric Context Aware System", 2006, pp. 215-220.

(Continued)

*Primary Examiner* — Zarni Maung
(74) *Attorney, Agent, or Firm* — Schwegman Lundberg & Woessner, P.A.

(57) ABSTRACT

Techniques to manage presence information are described. An apparatus may comprise a presence management component operative to manage presence information for a presentity node. The presence management component may comprise a presence normalization module operative to retrieve presence temporal information for a home time zone, and normalize the presence temporal information for a local time zone of the presentity node to form normalized presence temporal information. The presence management component may further comprise a presence control module communicatively coupled to the presence normalization module. The presence control module may be operative to send presence state information from the presentity node to a presence server based on the normalized presence temporal information. Other embodiments are described and claimed.

13 Claims, 6 Drawing Sheets

(56) References Cited

U.S. PATENT DOCUMENTS

| | | | |
|---|---|---|---|
| 7,302,270 B1* | 11/2007 | Day | H04L 67/24 455/404.2 |
| 7,363,345 B2* | 4/2008 | Austin-Lane | H04L 12/58 709/207 |
| 7,676,288 B2* | 3/2010 | Middleton, Jr. | 700/83 |
| 7,783,988 B2* | 8/2010 | Curran | 715/780 |
| 2002/0038234 A1* | 3/2002 | Fu et al. | 705/8 |
| 2003/0074280 A1* | 4/2003 | Lai | G06Q 20/0855 705/78 |
| 2004/0044736 A1* | 3/2004 | Austin-Lane | H04L 12/58 709/206 |
| 2005/0021773 A1* | 1/2005 | Shiga et al. | 709/228 |
| 2005/0195954 A1 | 9/2005 | Klein et al. | |
| 2005/0243782 A1* | 11/2005 | Sakoda et al. | 370/338 |
| 2005/0262211 A1* | 11/2005 | Yamashita | 709/206 |
| 2006/0041582 A1* | 2/2006 | Hekmatpour | 707/102 |
| 2006/0120281 A1* | 6/2006 | Schmidt | H04M 3/42374 370/223 |
| 2006/0149816 A1 | 7/2006 | Cadiz et al. | |
| 2006/0206912 A1* | 9/2006 | Klarfeld et al. | 725/40 |
| 2006/0212904 A1* | 9/2006 | Klarfeld et al. | 725/46 |
| 2006/0230137 A1 | 10/2006 | Gare et al. | |
| 2006/0239186 A1* | 10/2006 | Wu | H04L 67/14 370/229 |
| 2007/0007331 A1* | 1/2007 | Jasper et al. | 235/379 |
| 2007/0021997 A1* | 1/2007 | Hayes et al. | 705/9 |
| 2007/0040026 A1* | 2/2007 | Vleet et al. | 235/383 |
| 2007/0069888 A1 | 3/2007 | Parameswar | |
| 2007/0076872 A1* | 4/2007 | Juneau | 380/202 |
| 2007/0130260 A1 | 6/2007 | Weintraub et al. | |
| 2007/0150491 A1* | 6/2007 | Torvinen | 707/100 |
| 2007/0165554 A1 | 7/2007 | Jefferson et al. | |
| 2007/0185752 A1* | 8/2007 | Curran | 705/8 |
| 2007/0186193 A1* | 8/2007 | Curran | 715/968 |
| 2007/0250591 A1* | 10/2007 | Milic-Frayling et al. | 709/217 |
| 2008/0016247 A1* | 1/2008 | Pharn | 709/248 |
| 2008/0126408 A1* | 5/2008 | Middleton | 707/104.1 |
| 2008/0136897 A1* | 6/2008 | Morishima et al. | 348/14.08 |
| 2008/0199155 A1* | 8/2008 | Hagens et al. | 386/124 |
| 2008/0219423 A1* | 9/2008 | Lyman | 379/134 |
| 2009/0049125 A1* | 2/2009 | Channabasavaiah | 709/204 |
| 2009/0164283 A1* | 6/2009 | Coley | 705/7 |
| 2009/0262668 A1* | 10/2009 | Hemar et al. | 370/260 |
| 2009/0280789 A1* | 11/2009 | Takuno et al. | 455/418 |
| 2009/0300520 A1* | 12/2009 | Ashutosh et al. | 715/756 |
| 2013/0147622 A1* | 6/2013 | LaLonde et al. | 340/539.12 |

OTHER PUBLICATIONS

"Cisco Unified Mobile Communicator 3.0 User Portal Guide", http://www.cisco.com/en/US/docs/voice_ip_comm/cumc/3_0/english/portal/user/guide/cumc_upg.pdf.

Chen, et al., "A Survey of Context-Aware Mobile Computing Research", 2000, pp. 1-16.

"Microsoft Office Communicator Mobile Getting Started Guide", http://www.microsoft.com/technet/prodtechnol/office/livecomm/library/como/gettingstarted/ComoGS_4.mspx.

* cited by examiner

RETRIEVE PRESENCE TEMPORAL INFORMATION FOR A HOME TIME ZONE
*402*

NORMALIZE THE PRESENCE TEMPORAL INFORMATION FOR A LOCAL TIME ZONE OF A PRESENTITY NODE TO FORM NORMALIZED PRESENCE TEMPORAL INFORMATION
*404*

SEND PRESENCE STATE INFORMATION FROM THE PRESENTITY NODE TO A PRESENCE SERVER BASED ON THE NORMALIZED PRESENCE TEMPORAL INFORMATION
*406*

TECHNIQUES TO MANAGE PRESENCE INFORMATION

BACKGROUND

In computer and telecommunications networks, presence information is used to convey ability and willingness of a potential communication partner to communicate. The communication partner typically provides presence state information via a network connection to a presence service. The presence service publishes the presence state information to a set of watchers, who can then determine whether the communication partner is available or willing to open a communication channel. The more accurate or precise the presence state information, the more effective communications becomes between two or more parties. It is with respect to these and other considerations that the present improvements are needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques for a communications network. Some embodiments are particularly directed to techniques to manage presence information for various nodes in a communications network. In one embodiment, for example, an apparatus may comprise a presentity node having, among other elements, a presence management subsystem having a presence management component operative to manage presence information for the presentity node. The presence management component may comprise, among other elements, a presence normalization module operative to retrieve presence temporal information for a home time zone, and normalize the presence temporal information for a local time zone of the presentity node to form normalized presence temporal information. The presence management component may further comprise a presence control module communicatively coupled to the presence normalization module. The presence control module may be operative to send presence state information from the presentity node to a presence server based on the normalized presence temporal information. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments are directed to enhanced techniques to manage presence information for a presentity node in a communications network. The term "presentity" may refer to an entity described by presence information. The entity may comprise, for example, a human user or operator of an electronic device. A presentity node may refer to an electronic device used by a presentity to convey presence state information to watcher nodes over a network. The watcher nodes display the presence state information for other human users or operators sometimes referred to as watchers. The watchers may then determine whether a presentity is willing and/or able to communicate with another communication partner based on the presence state information.

A presentity node may publish presence state information to indicate its current communication status. This published presence state information informs others that desire to contact the presentity of his/her availability and willingness to communicate. A common use of presence state information is to display an indicator icon on a communication application, such as an instant messaging (IM) client. The indicator icon may comprise a graphic symbol corresponding with an easy-to-convey meaning, and a list of corresponding text descriptions for each of the states. Examples of such text descriptions may include "free for chat," "busy," "away," "do not disturb," "out to lunch" and so forth. Such presence states exist in many variations across different communications clients. Current standards typically support a rich choice of additional presence attributes that can be used for presence information, such as user mood, location, or free text status.

In some cases, however, the presence state information may not accurately represent whether a presentity is willing and able to communicate with a communication partner due to geographic constraints, among other design problems. For example, a single presentity may utilize a number of different electronic devices in different geographical locations. A knowledge worker may have multiple offices which are geographically dispersed from each other, with each office having a desktop computer. Entering presence definition information for a calendar application on a first desktop computer in a New York office using a first time zone such as the Eastern Standard Time (EST) zone is not useful for a second desktop computer in a Washington office using a second time zone such as the Pacific Standard Time (PST) zone. In another example, a presentity may use a type of electronic device that is geographically mobile, such as a laptop computer, handheld computer, or a smart phone. In this case, presence state information that is time dependent may not be accurate when the electronic device moves between different time zones.

To solve these and other problems, various embodiments may be directed to enhanced techniques to manage presence information for a presentity. More particularly, some embodiments may manage presence information for a presentity node having a presence management subsystem with a presence management component operative to manage presence information for the presentity node. The presence management component may comprise a presence normalization module operative to retrieve presence temporal information for a first time zone, such as a home time zone, and normalize the presence temporal information for a second time zone, such as a local time zone, of the presentity node to form normalized presence temporal information. The presence management component may further comprise a presence control module communicatively coupled to the presence normalization module. The presence control module may be operative to receive and analyze the normalized presence temporal information, and send presence state information from the presentity node to a presence server based on the normalized presence temporal information. The presence server may publish the presence state information to a set of watcher nodes over a network, thereby allowing a watcher to more accurately determine whether the presentity is willing and able to establish a communication channel with the watcher to engage in a communication session. As a result, the embodiments can improve affordability, scalability, modularity, extendibility, or interoperability for an operator, device or network.

Figure 1:
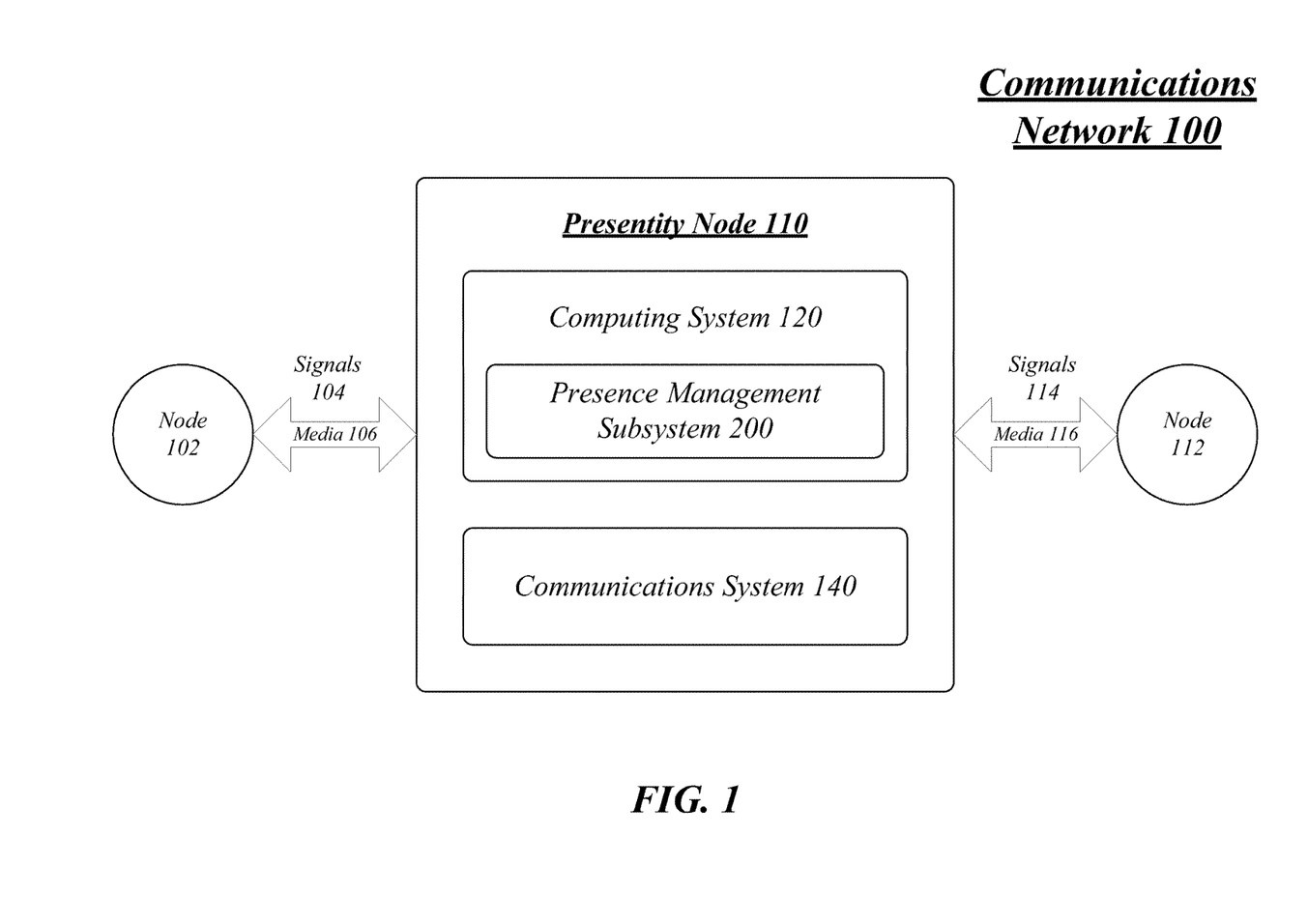
FIG. 1 illustrates an embodiment of a first network.

FIG. 1 illustrates a block diagram for a communications network 100. The communications network 100 may comprise various elements designed for implementation by a single entity environment or a multiple entity distributed environment. Each element may be implemented as a hardware element, software element, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof.

As used herein the terms "system," "subsystem," "component," and "module" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the communications network 100 may comprise, among other elements, multiple nodes 102, 110 and 112. A node generally may comprise any electronic device designed for managing, processing or communicating information in the communications network 100. Examples for a node may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a super-computer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the communications network 100 as shown in FIG. 1 has a limited number of nodes in a certain topology, it may be appreciated that the communications network 100 may include more or less nodes in alternate topologies as desired for a given implementation.

The nodes 102, 112 may be communicatively coupled to the node 110 via respective communications media 106, 116. The nodes 102, 110, 112 may coordinate operations between each other. The coordination may involve the uni-directional or bi-directional exchange of information. For instance, the nodes 102, 112 may communicate information with the node 110 in the form of respective signals 104, 114 communicated over the respective communications media 106, 116. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In various embodiments, the node 110 may be implemented as a presentity node 110, and the nodes 102, 112 may be implemented as respective watcher nodes 110, 112. The presentity node 110 may comprise any logical or physical entity that is arranged to receive, manage, process or communicate presence information with the watcher nodes 102, 112. The watcher nodes 110, 112 may comprise any logical or physical entity that is arranged to receive presence information from the presentity node 110.

The presentity node 110 may comprise a computing system 120 and/or a communications system 140. The computing system 120 includes various common computing elements, such as one or more processors, co-processors, memory units, chipsets, controllers, peripherals, interfaces, oscillators, timing devices, video cards, audio cards, multimedia input/output (I/O) components, and so forth. The communications system 140 includes various common communications elements, such as a transmitter, receiver, transceiver, radio, network interface, baseband processor, antenna, amplifiers, filters, and so forth. In one embodiment, for example, the presentity node 110 may be implemented using a computing and communications architecture as described with reference to FIG. 5.

Figure 2:
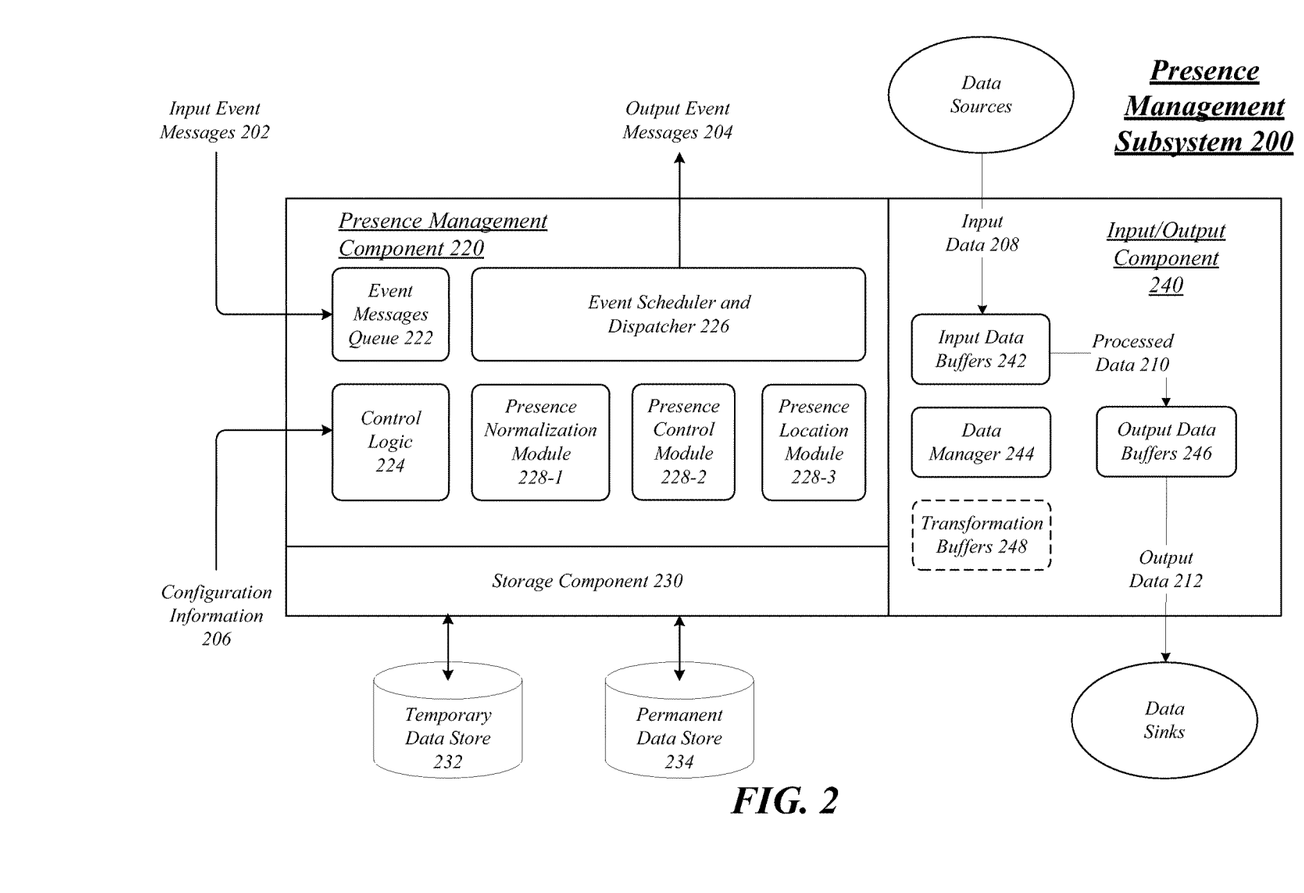
FIG. 2 illustrates an embodiment of a presence management subsystem.

The computing system 120 and/or the communications system 140 may include a presence management subsystem 200. The presence management subsystem 200 may implement various enhanced techniques to manage presence information for the presentity node 110 in the communications network 100. The presence management subsystem 200 may receive notification of various events related to the presentity node 110, generate presence information for the presentity node 110 in accordance with the input events, and send the generated presence information to a presence server to publish the presence information to one or more watcher nodes 110, 112. Additionally or alternatively, the presentity node 110 may send the presence information directly to the watcher nodes 110, 112, thereby reducing or eliminating the need for the presence server.

In some cases, the presence management subsystem 200 may be particularly directed to managing presence temporal information for the presentity node 110. Presence temporal information may comprise any type of presence information that has a time attribute associated with the presence information. For example, the presence temporal information may include a date and/or time for when a presentity is available or unavailable to communicate. This may be useful when defining an amount of time or time segment a presentity might be available or unavailable to communicate. For example, a presentity may provide presence temporal information in the form of business hours and personal hours. The business hours may refer to the dates and/or times when the presentity is available for business matters. The personal hours may refer to the dates and/or times when the presentity is available for personal matters, or stated another way, when the presentity is not available for business matters. In this manner, a presentity may maintain a desired work/life balance.

In addition to business hours and personal hours, the presentity temporal information may be defined in terms of a home time zone and a local time zone. A time zone may refer to a region of the earth that has adopted the same standard time. Most adjacent time zones are exactly one hour apart, and by convention compute their local time as an offset from Coordinated Universal Time (UTC). A home time zone may represent a primary time zone for a location where an operator is typically present, such as a primary residence or office. For example, when a presentity enters his/her business hours into a calendar application program for the primary residence or office, the business hours are defined in terms of a time zone, such as Greenwich Mean Time (GMT), Eastern Standard Time (EST), Mountain Standard Time (MST), Pacific Standard Time (PST), and so forth. A local time zone may represent a secondary time zone for a location where the operator is currently located at any given moment in time, and is typically somewhere other than the location for the home time zone. For example, a presentity may enter a local time zone when traveling with a mobile device.

The presence management subsystem 200 may receive presence definition information including presence temporal information from many different sources. For example, the presence management subsystem 200 may receive presence definition information from a messaging and collaboration client, such as MICROSOFT® OUTLOOK® made by Microsoft Corporation, Redmond, Wash. The presence management subsystem 200 may also receive presence definition information from a calendar application, a system application, or other application program. The presence management subsystem 200 may also receive presence definition information directly from a presentity using a graphics user interface (GUI) implemented specifically for the presence management subsystem 200 or generally for a system application (e.g., an operating system).

The presence management subsystem 200 may receive presence definition information including presence temporal information, and normalize the presence temporal information based on a given local time zone for a current location for the presentity node 110. The presence management subsystem 200 may convey presence state information derived from the normalized presence temporal information in the form of communications signals 104, 114 communicated to respective watcher nodes 102, 112 over the respective communications media 106, 116 and any intermediate nodes (e.g., a presence server). The watcher nodes 102, 112 display the presence state information for watchers. The watchers may then determine whether a presentity using the presentity node 110 is willing and able to communicate with a watcher using one of the watcher nodes 102, 112 based on the presence state information. In this manner, the presentity node 110 may generate presence temporal information that more precisely reflects the true availability and unavailability of a presentity, particular as they travel through various time zones. Additional details for the presence management subsystem 200 may be described with reference to FIG. 2.

FIG. 2 illustrates an embodiment of the presence management subsystem 200. The presence management subsystem 200 may comprise multiple components and/or modules. In the illustrated embodiment shown in FIG. 2, the presence management subsystem 200 may include a presence management component 220, a storage component 230, and an input/output (I/O) component 240. The components and/or modules may be implemented using hardware elements, software elements, or a combination of hardware elements and software elements. Although the presence management subsystem 200 as shown in FIG. 2 has a limited number of elements in a certain topology, it may be appreciated that the presence management subsystem 200 may include more or less elements in alternate topologies as desired for a given implementation.

A presence management component 220 may be arranged to receive various input event messages 202 at an event message queue 222. The event message queue 222 may comprise one or more queues for handling event messages. In one embodiment, for example, the event message queue 222 may handle event messages with distinct priorities. Examples of input event messages 202 may include without limitation requests for presence information, notification of incoming communications requests, updated time zone information as the presentity node 110 moves between different geographic locations, updated network information as the presentity node 110 moves between networks, updated location information from an external location source (e.g., base station triangulation), and other input events relevant to the operations of the presentity node 110.

The presence management component 220 may include control logic 224. The control logic 224 may be arranged to control operations of the presence management component 220 based on configuration information 206. For example, the control logic 224 may execute an algorithm, logic flow or a state machine to perform various operations on the input data 208 in response to the various input event messages 202. The control logic 224 may process the input data 208 based on the configuration information 206 to form processed data 210. The control logic 224 may also generate various output event messages 204, and send the output event messages 204 to an event scheduler and dispatcher 226.

The presence management component 220 may include an event scheduler and dispatcher 226. The event scheduler and dispatcher 226 may be arranged to initiate events to other external entities, and dispatches internal events and messages within the presence management component 220. For example, the event scheduler and dispatcher 226 to send various output event messages 204 responsive to the input event messages 202 to other systems, subsystems, components or modules for the systems 120, 140, the presentity node 110, and/or the communications network 100. Examples of output event messages 204 may include without limitation publishing various types of presence information such as presence definition information and presence state information, location information, control directives to the communications system 140 to route incoming communications requests, and so forth.

In one embodiment, the presence management subsystem 200 may include the storage component 230. The storage component 230 may be arranged with data stores and logic to manage storage operations for the presence management component 220. The storage component 230 may store temporary or non-transacted information used by the presence management component 220 in a temporary data store 232. For example, the temporary or non-transacted information may be stored as extensible markup language (XML), binary files, or some other format in the temporary data store 232. The storage component 230 may store persistent or transacted information used by the presence management component 220 in a permanent data store 234. The data stores 232, 234 may comprise individual data stores, respectively, or multiple data stores comprising part of a larger data store array, such as a storage area network (SAN). Furthermore, the storage component 230 and the data stores 232, 234 may implement the appropriate data buffering and caching techniques and structures if needed to meet system latency and capacity parameters. The storage component 230 also manages operations for logging and auditing storage.

In one embodiment, the presence management subsystem 200 may include the I/O component 240. The I/O component 240 may be arranged with buffers and logic to manage transport and I/O operations in moving information throughout the presence management subsystem 200. For example, the I/O component 240 may include one or more input data buffers 242 to receive and store input data 208 from an input subsystem. One or more modules of the presence management component 220 may process the input data 208 to form processed data 210, and send it to one or more output data buffers 246. The output data buffers 246 may be arranged to store and send output data 212 to an output subsystem. A data manager 244 may implement logic and network interfaces (e.g., web service interfaces) to control and manage data collection services and data distribution services. Optionally, the I/O component 240 may implement one or more transformation buffers 248 to transform the input data 208 and/or the processed data 210 from one format, data schema or protocol, to alternate formats, data schemas, or protocols.

In general operation, the presence management subsystem 200 may be arranged to implement various enhanced presence information management techniques. This may be accomplished using a number of presence modules 228-1-p. In the illustrated embodiment shown in FIG. 2, the modules 228-1-p may include a presence normalization module 228-1, a presence control module 228-2, and a presence location module 228-3. Although a specific number of presence modules 228-1-p are shown in FIG. 2 by way of example and not limitation, it may be appreciated that more or less modules may be implemented for various sets of innovation market operations as desired for a given implementation. The embodiments are not limited in this context.

The presence normalization module 228-1 may be generally arranged to normalize presence temporal information based on a current location for the presentity node 110. In one embodiment, for example, the presence normalization module 228-1 may be operative to retrieve presence temporal information for a first time zone, and normalize the presence temporal information for a second time zone of the presentity node 110 to form normalized presence temporal information. An example of a first time zone may include a home time zone, and the second time zone may include a local time zone.

The presence normalization module 228-1 may be operative to retrieve different types of presence temporal information with different time segments (e.g., days, hours, minutes, etc.) and presence attributes. In one embodiment, for example, the presence normalization module 228-1 may be operative to retrieve presence business temporal information and presence personal temporal information. The presence business temporal information may represent business hours when a user is available for business matters in the home time zone. For example, a presentity may explicitly define presence business temporal information as between the hours of 8:00 am PST to 5:00 pm PST. The presence personal temporal information may represent personal hours when a user is available for personal matters in the home time zone. For example, a presentity may explicitly define presence personal temporal information as between the hours of 5:00 pm PST to 8:00 am PST. It may be appreciated that the presence business temporal information may be implicitly inferred from the presence personal temporal information, and vice-versa.

Additionally or alternatively, a presentity may define other types of presence temporal information. A presentity may implicitly or explicitly define other time segments with varying levels of priority. For example, a presentity may explicitly define presence urgent temporal information as between the hours of 5:00 pm PST to 12:00 pm PST, presence critical temporal information as between the hours of 5:00 pm PST to 2:00 pm PST, presence family temporal information as any time, and so forth. It may be appreciated that any number of types and corresponding time segments for the presence temporal information may be defined by a presentity, and the embodiments are not limited in this context.

The presence normalization module 228-1 may be operative to normalize the different types of presence temporal information based on a local time zone to form normalized presence temporal information. In one embodiment, for example, the presence normalization module 228-1 may be operative to normalize presence business temporal information for the local time zone to form normalized presence business temporal information. Similarly, the presence normalization module 228-1 may also normalize presence personal temporal information for the local time zone to form normalized presence personal temporal information.

By way of example, assume the presentity node 110 moves from a first region utilizing a first time zone such as PST to a second region utilizing a second time zone such as EST. Although the presentity is in a different time zone, the presentity node 110 still publishes presence state information using the original presence business temporal information of 8:00 am PST to 5:00 pm PST. Consequently, the presentity may receive incoming communications requests (e.g., telephone calls, IM, email, etc.) between the hours of 11:00 am EST to 8:00 pm EST. This may result in a loss of work-life balance for the presentity.

To reduce or avoid this scenario, the presence normalization module 228-1 may convert the presence business temporal information based on a current location and time zone for the presentity node 110. The presence normalization module 228-1 may perform normalization operations in a number of different ways. For instance, the presence normalization module 228-1 may shift the business hours of the home time zone to reflect the hour differential of the local time zone. Continuing with the previous example, the presence normalization module 228-1 may convert the presence business temporal information of 8:00 am PST to 5:00 pm PST to the normalized presence business temporal information of 5:00 am PST to 2:00 pm PST for publishing to the watcher nodes 102, 112. This may let watchers who share the same PST time zone that the business hours of the presentity are limited based on travel or present geographic location without forcing the watchers to convert from a local time zone back to the home time zone.

Additionally or alternatively, the presence normalization module 228-1 may convert the business hours of the home time zone into the equivalent in the local time zone. For instance, the presence normalization module 228-1 may convert the presence business temporal information of 8:00 am PST to 5:00 pm PST to the normalized presence business temporal information of 11:00 am EST to 8:00 pm EST for publishing to the watcher nodes 102, 112. This may let watchers who share the same EST time zone that the business hours of the presentity are limited based on travel or present geographic location without forcing the watchers to convert from the home time zone to the local time zone.

The presence control module 228-2 may be generally arranged to control operations for the presence management subsystem 200. In one embodiment, for example, the presence control module 228-2 may be operative to send presence state information from the presentity node 110-1 to a presence server based on the normalized presence temporal information. The presence state information may comprise the normalized presence temporal information itself, presence states derived from the normalized presence temporal information, combinations of both, and so forth. The presence state information may be communicated in the form of an output event message 304 from the presence management component 220.

The presence location module 228-3 may be generally arranged to provide location information to the presence control module 228-2. The presence location module 228-3 may receive the location information from various internal or external sources, such as a global positioning satellite (GPS) receiver, a base station using triangulation techniques, map-based location techniques, and so forth. The presence location information module 228-3 may periodically send current location information to the presence modules 228-1, 228-2 for use in normalizing operations, control operations, and/or subsequent handling operations. Additionally or alternatively, the presence location module 228-3 may retrieve time zone information corresponding to the current location, via an internal table or external network source, and output the time zone information to the presence modules 228-1, 228-2.

Figure 3:
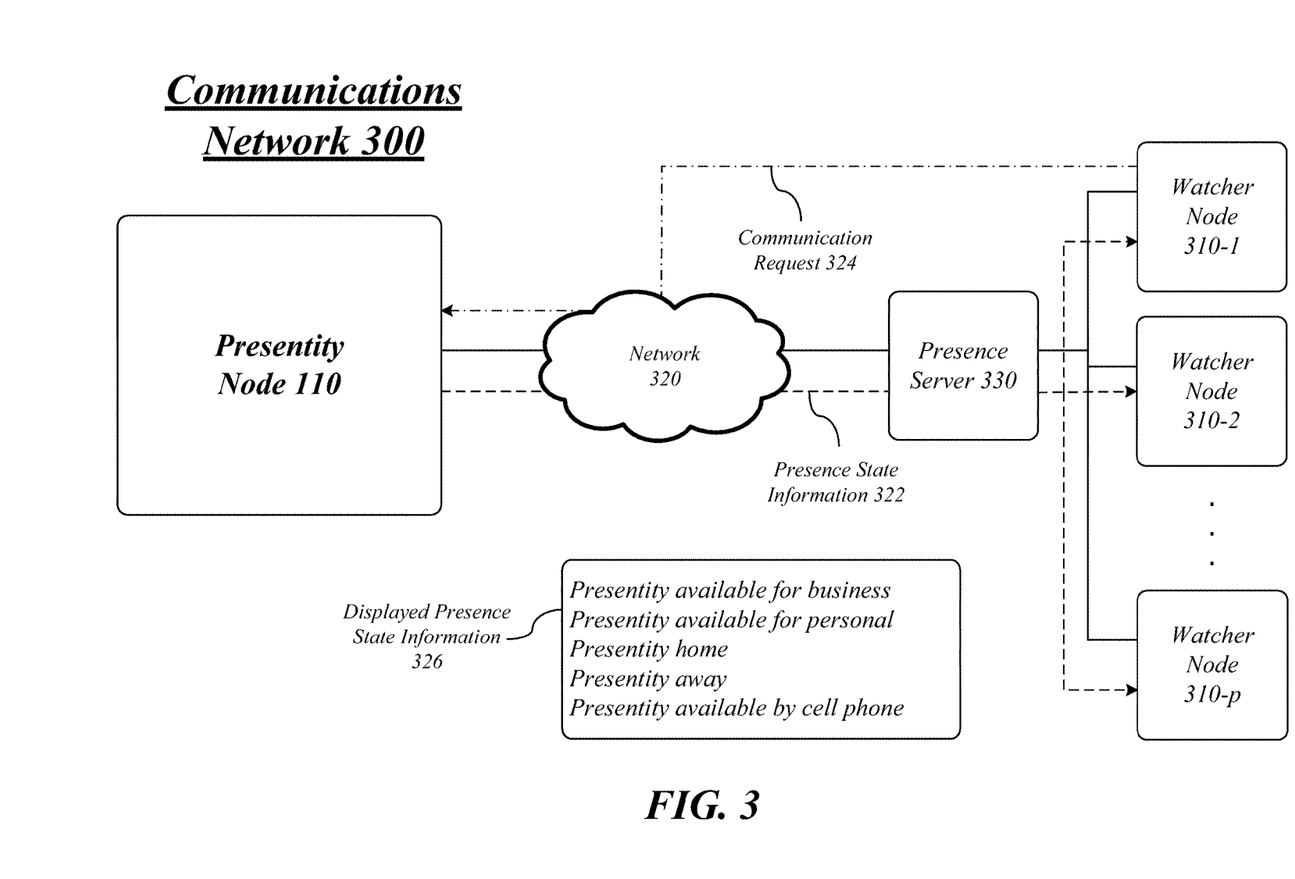
FIG. 3 illustrates an embodiment of a second network.

FIG. 3 illustrates a block diagram for a communications network 300. The communications network 300 is similar to the communications network 100, with some additional nodes. In the illustrated embodiment shown in FIG. 3, the presentity node 110 may communicate with a presence server 330 and one or more watcher nodes 310-1-*p*. The watcher nodes 310-1-*p* may be representative of, for example, the watcher nodes 102, 112 as described with reference to FIG. 1.

Referring again to the presence management component 220, the presence control module 228-2 may send presence state information 322 to the presence server 330. The presence state information 322 may be derived from the normalized presence temporal information generated by the presence normalization module 228-1. The presence state information 322 may represent any number of defined presence states for a presentity. In a basic form, the presence state information 322 may include presence available state information and presence unavailable state information.

The presence control module 228-2 may be arranged to send the presence available state information from the presentity node 110 to the presence server 330 when a current date and time match the normalized presence business temporal information. For example, assume the presence control module 228-2 retrieves a current date and time for a local time zone from an internal source (e.g., an internal clock) or an external source (e.g., a network). The presence control module 228-2 may compare the current date and time to determine whether it falls within the business hours of the normalized presence business temporal information. Similarly, the presence control module 228-2 may send presence unavailable state information from the presentity node 110 to the presence server 330 when the current date and time does not match the normalized presence business temporal information. It may be appreciated that the presence control module 228-2 may send other types of presence state information as defined for a given implementation.

Continuing with our previous example, if the presence normalization module 228-1 outputs the normalized presence business temporal information comprising 5:00 am PST to 2:00 pm PST, then when the current date and time falls within 5:00 am PST to 2:00 pm PST, the presence control module 228-2 will send presence state information 322 in the form of presence available state information to the presence server 330 via the network 320. The presence server 330 may publish the presence available state information to the watchers nodes 310-1-*p*. This may be rendered on a display device for the watcher nodes 310-1-*p* using various media content (e.g., icons, text, symbols, images, pictures, etc.) to form displayed presence state information 326. For example, the watcher nodes 310-1-*p* may display a text message such as "Presentity available for business" when receiving presence available state information from the presence server 330. When the current date and time falls outside of 5:00 pm PST to 2:00 pm PST, the presence control module 228-2 may send presence state information 322 in the form of presence unavailable state information to the presence server 330 via the network 320. The presence server 330 may publish the presence unavailable state information to the watchers nodes 310-1-*p*. The watcher nodes 310-1-*p* may display a text message such as "Presentity available for personal" or "Presentity unavailable for business" when receiving presence unavailable state information from the presence server 330.

In addition to sending presence state information 322 from the presentity node 110 to the watcher nodes 310-1-*p*, either directly or indirectly (through the presence server 330), the presence control module 228-2 may handle various types of incoming communications requests 324 based on the normalized presence temporal information. The incoming communications requests 324 may represent any request to establish a communications channel or session with the presentity via the communications capabilities implemented by the presentity node 110. Examples of communications techniques may include without limitation a telephone call, a Voice Over Internet Protocol (VoIP) telephone call, an IM session, a group IM session, a data session, a peer-to-peer session, an email session, and so forth.

More particularly, the presence control module 228-2 may be operative to generate control directives for subsequent handling operations for an incoming communication request received by the presentity node 110 based on the presence state information 322 for the presentity node 110. The subsequent handling operations may include a set of rules for handling the incoming communications requests 324. Examples of subsequent handling operations may include without limitation routing a communications request to voicemail, routing a communications request to a different presentity node 110 for the same presentity, routing a communications request to a different presentity node 110 for a different presentity, providing an automatic denial of a communications request, providing an automatic response to a communications request, and so forth. The types of subsequent handling operations may vary according to a given implementation, and the embodiments are not limited in this context.

One of the subsequent handling operations may include selecting a different presentity alert profile for different incoming communications requests 324. In one embodiment, for example, the presence control module 228-2 may be operative to retrieve different presentity alert profiles corresponding to different presence state information 322 for the presentity node 110. Each presentity alert profile may comprise a different or specialized set of alert parameters for the presentity node 110. The alert parameters may control various output devices for the presentity node 110, such as a display, light emitting diodes (LEDs), speakers, vibrators and so forth. For example, a presentity may define a business alert profile to reproduce a particular ringtone and volume for business calls, a personal alert profile reproduce a different ringtone and volume for personal calls, and so forth.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 4:
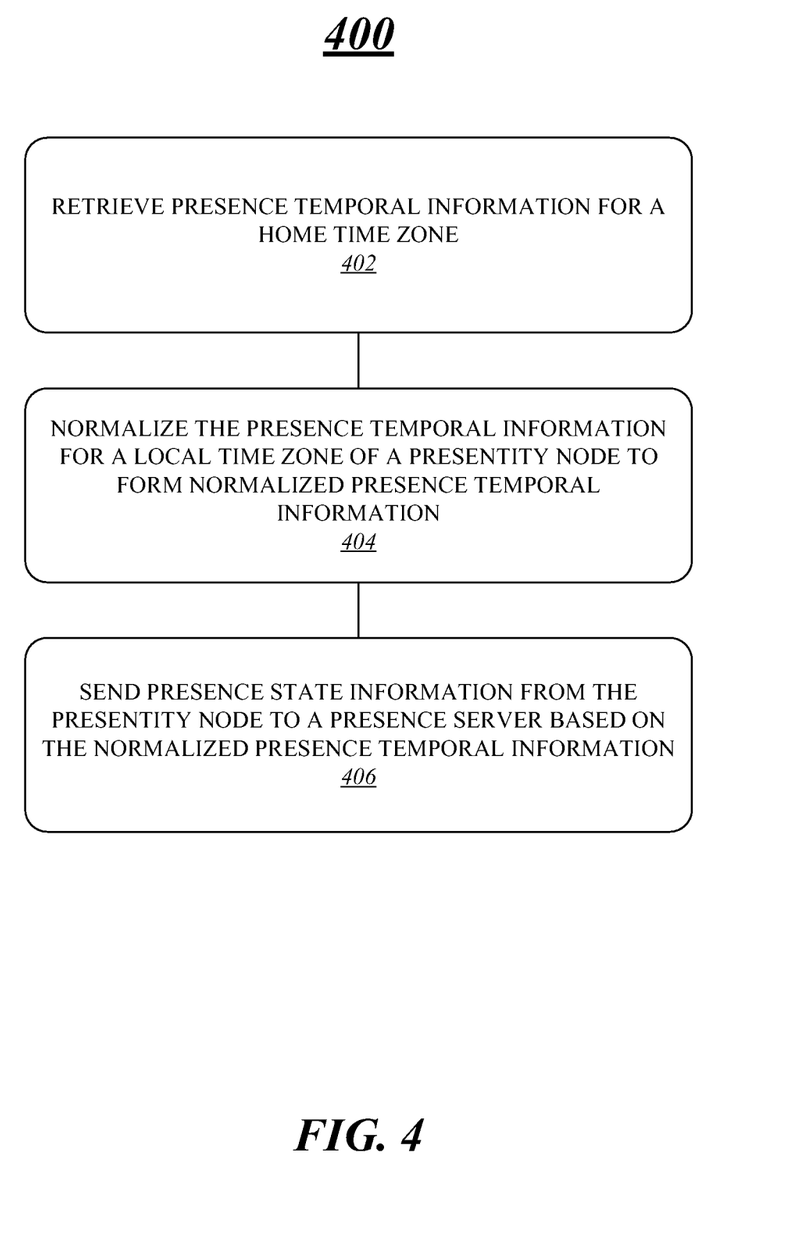
FIG. 4 illustrates an embodiment of a logic flow.

FIG. 4 illustrates one embodiment of a logic flow 400. The logic flow 400 may be representative of some or all of the operations executed by one or more embodiments described herein.

In the illustrated embodiment shown in FIG. 4, the logic flow 400 may retrieve presence temporal information for a home time zone at block 402. For example, the presence normalization module 228-1 may retrieve presence temporal information for a home time zone. The presence normalization module 228-1 may retrieve the temporal information from another application program such as a calendar application or messaging and collaboration application, another node such as the presence server 330, and so forth.

The logic flow 400 may normalize the presence temporal information for a local time zone of a presentity node to form normalized presence temporal information at block 404. For example, the presence normalization module 228-1 may normalize the presence temporal information for a local time zone of the presentity node 110 to form normalized presence temporal information. The normalized presence temporal information may be generated using at least two techniques. The first technique includes shifting a time segment (e.g., business hours) in terms of the home time zone when in the local time zone, such as 8:00 am PST to 5:00 am PST when local time zone is EST, for example. The second technique includes converting a time segment from the home time zone to the local time zone, such as 8:00 am PST to 11:00 am EST when local time zone is EST, for example. Other techniques may be used.

The logic flow 400 may send presence state information from the presentity node to a presence server based on the normalized presence temporal information at block 406. For example, the presence control module 228-2 may send presence state information 322 from the presentity node 110 to the presence server 330 based on the normalized presence temporal information. The presence state information 322 may include presence available state information and presence unavailable state information. The presence state information 322 may also include the normalized presence temporal information in a raw form.

Figure 5:
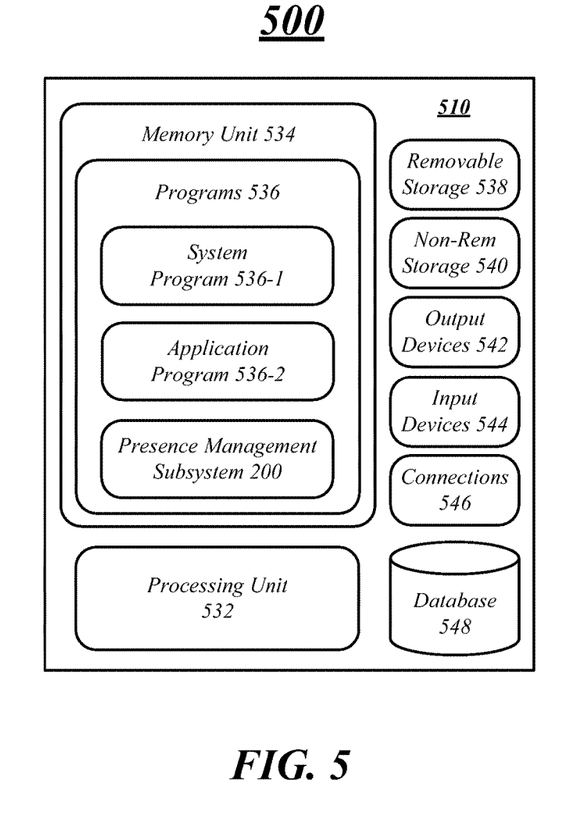
FIG. 5 illustrates an embodiment of a computing architecture.

FIG. 5 further illustrates a more detailed block diagram of computing architecture 510 suitable for implementing the presentity node 110. In a basic configuration, computing architecture 510 typically includes at least one processing unit 532 and memory 534. Memory 534 may be implemented using any machine-readable or computer-readable media capable of storing data, including both volatile and non-volatile memory. For example, memory 534 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 5, memory 534 may store various software programs, such as one or more software programs 536-1-$t$ and accompanying data. Depending on the implementation, examples of software programs 536-1-$t$ may include a system program 536-1 (e.g., an operating system), an application program 536-2 (e.g., a calendar application), the presence management subsystem 200, and so forth.

Computing architecture 510 may also have additional features and/or functionality beyond its basic configuration. For example, computing architecture 510 may include removable storage 538 and non-removable storage 540, which may also comprise various types of machine-readable or computer-readable media as previously described. Computing architecture 510 may also have one or more input devices 544 such as a keyboard, mouse, pen, voice input device, touch input device, measurement devices, sensors, and so forth. Computing architecture 510 may also include one or more output devices 542, such as displays, speakers, printers, and so forth.

Computing architecture 510 may further include one or more communications connections 546 that allow computing architecture 510 to communicate with other devices. Communications connections 546 may be representative of, for example, the communications interfaces for the communications components 116-1-v. Communications connections 546 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

Figure 6:
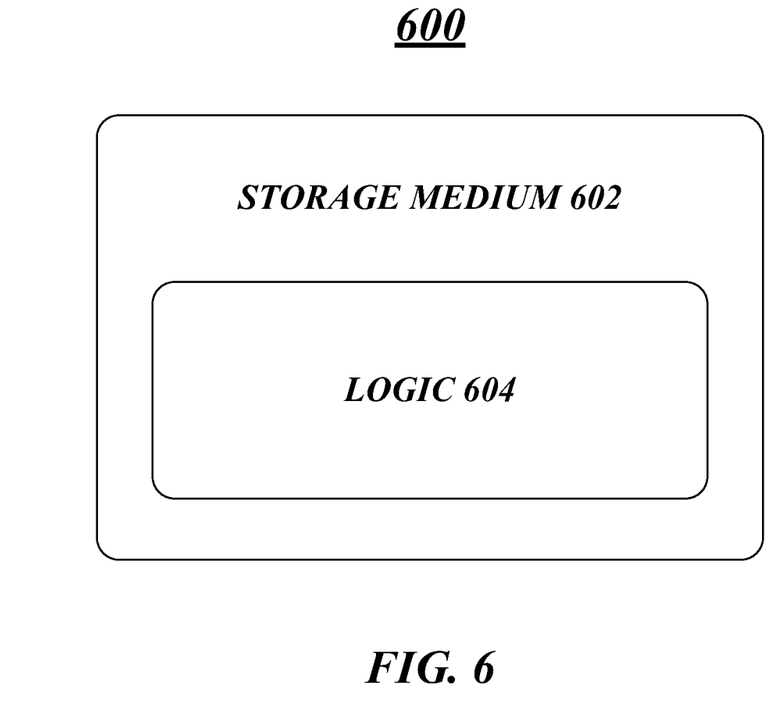
FIG. 6 illustrates an embodiment of an article.

FIG. 6 illustrates a diagram an article of manufacture 600 suitable for storing logic for the various embodiments. As shown, the article of manufacture 600 may comprise a storage medium 602 to store logic 604. Examples of the storage medium 602 may include one or more types of computer-readable storage media capable of storing electronic data, including volatile memory or non-volatile memory, removable or non-removable memory, erasable or non-erasable memory, writeable or re-writeable memory, and so forth. Examples of the logic 604 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article of manufacture 600 and/or the computer-readable storage medium 602 may store logic 604 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
retrieving, by a presence management component executing on a processor in a presentity node, presence temporal information for a home time zone from an application program separate from the presence management component, the presence temporal information corresponding to time segments in at least three priority levels;
normalizing presence business temporal information and presence personal temporal information for the local time zone to form normalized presence business temporal information and normalized presence personal temporal information, the presence business temporal information representing business hours when a user is available for business matters in the home time zone, and the presence personal temporal information representing personal hours when a user is available for personal matters in the home time zone;
at least one of sending presence available state information from the presentity node to the presence server when a current date and time match the normalized presence business temporal information or match the normalized presence personal temporal information or sending presence unavailable state information from the presentity node to the presence server when the current date and time does not match the normalized presence business temporal information or match the normalized presence personal temporal information; and
generating control directives for subsequent handling operations for an incoming communication request received by the presentity node, based on the presence available state information or the presence unavailable state information for the presentity node.

2. The method of claim 1, comprising retrieving different presentity alert profiles corresponding to different presence state information for the presentity node, each presentity alert profile comprising alert parameters for the presentity node.

3. The method of claim 1, comprising retrieving a presentity business alert profile when a current date and time for the presentity node match the normalized presence business temporal information, and a presentity presence alert profile when the current date and time match the normalized presence personal temporal information.

4. An article comprising a hardware containing instructions that if executed enable a system to:
retrieve, by a presence management component executing in a presentity node, presence temporal information for a first time zone from an application program separate from the presence management component, the presence temporal information including presence business temporal information, presence personal temporal information, and presence urgent temporal information;
normalize the presence temporal information for a second time zone of the presentity node to form normalized presence temporal information as the presentity node moves between different geographic locations,
send presence state information from the presentity node to a presence server based on the normalized presence temporal information, the presence state information comprising presence available state information or presence unavailable state information; and
generate control directives for subsequent handling operations for an incoming communication request received by the presentity node based on the presence state information for the presentity node.

5. The article of claim 4, further comprising instructions that if executed enable the system to retrieve the presence business temporal information representing business hours when a user is available for business matters in the first time zone, and presence personal temporal information representing personal hours when a user is available for personal matters in the first time zone.

6. The article of claim 5, further comprising instructions that if executed enable the system to normalize the presence business temporal information for the second time zone to form normalized presence business temporal information, and presence personal temporal information for the second time zone to form normalized presence personal temporal information.

7. The article of claim 6, further comprising instructions that if executed enable the system to send the presence available state information from the presentity node to the presence server when a current date and time match the normalized presence business temporal information, and the presence unavailable state information from the presentity node to the presence server when the current date and time does not match the normalized presence business temporal information.

8. The article of claim 4, further comprising instructions that if executed enable the system to retrieve different presentity alert profiles corresponding to different presence state information for the presentity node, each presentity alert profile comprising alert parameters for the presentity node.

9. An apparatus, comprising:
a presence management component operative to manage presence information for a presentity node, the presence management component comprising:
a presence normalization module operative to retrieve presence temporal information for a home time zone from an application program separate from the presence management component, the presence temporal information defining a time segment for urgent matters, and normalize the presence temporal information for a local time zone of the presentity node to form normalized presence temporal information as the presentity node moves into a geographic location away from the home time zone; and
a presence control module communicatively coupled to the presence normalization module, the presence control module operative to send presence state information from the presentity node to a presence server based on the normalized presence temporal information and to generate control directives for subsequent handling operations for an incoming communication request received by the presentity node based on the presence state information for the presentity node.

10. The apparatus of claim 9, the presence normalization module operative to retrieve presence business temporal information representing business hours when a user is available for business matters in the home time zone, and presence personal temporal information representing personal hours when a user is available for personal matters in the home time zone.

11. The apparatus of claim 10, the presence normalization module operative to normalize presence business temporal information for the local time zone to form normalized presence business temporal information, and presence personal temporal information for the local time zone to form normalized presence personal temporal information.

12. The apparatus of claim 11, the presence control module operative to send presence available state information from the presentity node to the presence server when a current date and time match the normalized presence business temporal information, and presence unavailable state information from the presentity node to the presence server when the current date and time does not match the normalized presence business temporal information.

13. The apparatus of claim 9, the presence control module operative to retrieve different presentity alert profiles corresponding to different presence state information for the presentity node, each presentity alert profile comprising alert parameters for the presentity node.

* * * * *